(12) United States Patent
Lippert et al.

(10) Patent No.: US 7,610,900 B2
(45) Date of Patent: Nov. 3, 2009

(54) METHOD AND APPARATUS FOR OPERATING A SPARK-IGNITED DIRECT FUEL INJECTION ENGINE

(75) Inventors: Andreas M. Lippert, Rochester Hills, MI (US); Ronald M. Otto, Rochester Hills, MI (US); Scott E. Parrish, Farmington Hills, MI (US); Arun S. Solomon, Rochester Hills, MI (US); Ansis Upatnieks, Ann Arbor, MI (US); Yangbing Zeng, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/549,691

(22) Filed: Oct. 16, 2006

(65) Prior Publication Data
US 2007/0261672 A1    Nov. 15, 2007

Related U.S. Application Data

(60) Provisional application No. 60/733,218, filed on Nov. 3, 2005.

(51) Int. Cl.
*F02M 69/04* (2006.01)
(52) U.S. Cl. .................. 123/445; 123/299; 123/300
(58) Field of Classification Search ........... 123/298, 123/339.11, 406.47, 329, 406.26, 295, 260, 123/297, 299, 300, 305; 60/285
See application file for complete search history.

(56) References Cited

U.S. PATENT DOCUMENTS

| 4,305,351 | A | 12/1981 | Staerzl |
| 5,575,259 | A * | 11/1996 | Fukui et al. ............ 123/406.47 |
| 6,089,077 | A | 7/2000 | Daniels |
| 6,401,703 | B1 | 6/2002 | Mamiya et al. |
| 6,520,142 | B2 | 2/2003 | Nogl |
| 6,557,526 | B1 * | 5/2003 | Hoshino ................ 123/406.26 |
| 6,609,493 | B2 | 8/2003 | Yamaguchi |
| 6,659,074 | B2 | 12/2003 | Lippert et al. |
| 6,854,438 | B2 * | 2/2005 | Hilger et al. ................ 123/260 |
| 2003/0089331 | A1 * | 5/2003 | Ueda et al. ................... 123/295 |
| 2003/0168038 | A1 * | 9/2003 | McKay ....................... 123/297 |
| 2004/0011326 | A1 | 1/2004 | Yamashita et al. |

OTHER PUBLICATIONS

Szekely, G, Combustion Characteristics of a Spray-Guided DI Stratified Charge Engine with a High Squish Piston, SAE Tech Paper, 2005-01-1937, SAE Warrendale PA USA.

* cited by examiner

*Primary Examiner*—Stephen K Cronin
*Assistant Examiner*—Keith Coleman

(57) ABSTRACT

A method and article of manufacture are provided to operate a spray-guided, spark-ignition, direct fuel injection engine, including injecting a first fuel pulse during a combustion cycle, and initiating spark ignition by energizing a spark igniter. A second fuel pulse is injected during the combustion cycle effective to form an ignitable fuel-air mixture proximal to the spark igniter during a period in time whereat the spark igniter is energized. A preferred elapsed time between an end of the first fuel pulse and start of the spark ignition is determined based upon engine load.

19 Claims, 7 Drawing Sheets

METHOD AND APPARATUS FOR OPERATING A SPARK-IGNITED DIRECT FUEL INJECTION ENGINE

CROSS-REFERENCE TO RELATED APPLICATIONS

This application claims the benefit of U.S. Provisional Application No. 60/733,218 filed Nov. 3, 2005, entitled METHOD AND APPARATUS FOR RAPID MULTIPLE PULSING OF A FUEL INJECTOR IN A SPRAY-GUIDED DIRECT INJECTION GASOLINE ENGINE.

TECHNICAL FIELD

This invention pertains generally to internal combustion engine control systems, and more specifically to a method to control combustion in direct-injection, spark-ignited combustion engines.

BACKGROUND OF THE INVENTION

Designers of internal combustion engines are continually seeking to develop hardware and control strategies which improve fuel efficiency and reduce exhaust emissions. As an example, designers of engines using combustion-ignition strategies, i.e., diesel engines, have developed sophisticated injection systems which execute multiple fuel injection pulses within each cylinder during each combustion cycle. Such engines employ expensive piezoelectric technology, and since diesel engines do not employ spark ignition, there is no risk of having the multiple injection pulses interact with an arc from a spark plug. Some wall-guided gasoline spark-ignition, direct injection (SIDI) engines employ multiple fuel injection pulses using solenoid-operated swirl-spray injectors. Such injection pulses are typically selectively employed to achieve accelerated warm-up and light-off of exhaust aftertreatment devices, as well as to facilitate transition in engine operation between a stratified operating regime and a homogeneous engine operating regime. The period between two injection pulses in such engines is typically in a range of 180 crank-angle degrees (typically around 15 milliseconds at 2000 rpm). This time period is considered too large to have any opportunity for both fuel charges to interact with a spark arc.

What is needed is a system for control of an SIDI engine which provides multiple fuel injection pulses to control ignition and combustion processes within the combustion chamber, thus reducing combustion variability, improving fuel efficiency and reducing engine-out emissions.

SUMMARY OF THE INVENTION

In order to achieve the object of this invention, a method and article of manufacture are provided to operate a spray-guided, spark-ignition, direct fuel injection engine, including injecting a first fuel pulse during a combustion cycle, and initiating spark ignition by energizing a spark igniter. A second fuel pulse is injected during the combustion cycle effective to form an ignitable fuel-air mixture proximal to the spark igniter during a period in time whereat the spark igniter is energized. A preferred elapsed time between an end of the first fuel pulse and start of the spark ignition is determined based upon engine load.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF AN EMBODIMENT OF THE INVENTION

Figure 1:
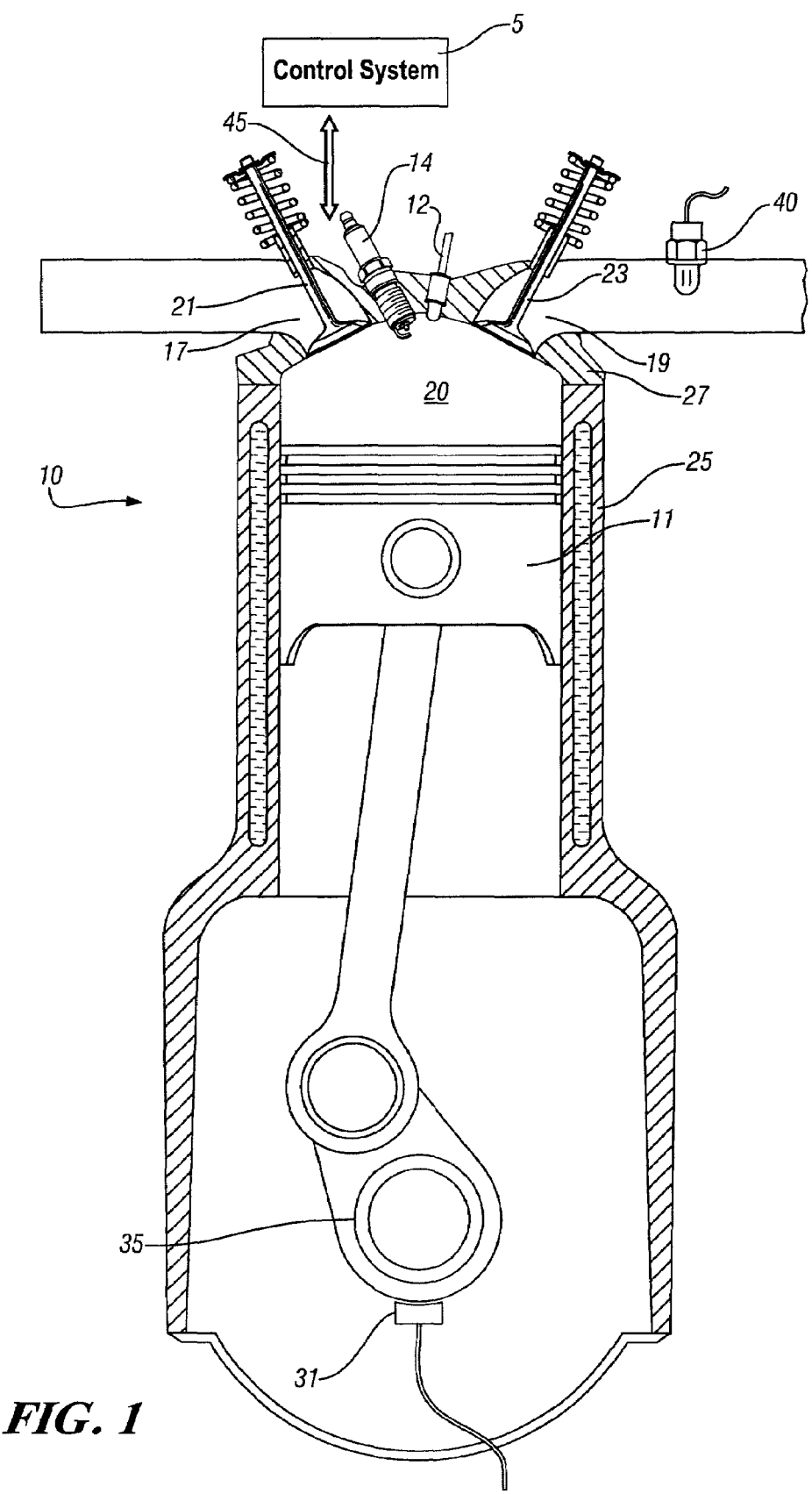
FIG. 1 is a schematic illustration of an internal combustion engine, in accordance with the present invention.

Referring now to the drawings, wherein the depictions are for the purpose of illustrating the invention only and not for the purpose of limiting the same, FIG. 1 depicts a schematic of an internal combustion engine 10 and control system 5 which has been constructed in accordance with an embodiment of the present invention. The exemplary engine comprises a direct-fuel-injection, spray-guided, spark ignition (SIDI) engine employing a high-squish combustion chamber geometry operating in a stratified-combustion charge regime. The engine control system is operative to provide rapid multiple pulsing of conventional fuel injectors, for example solenoid-operated, inwardly-opening, pintle-type multi-hole fuel injectors operating at a nominal pressure of 20 MPa. It is understood that the present invention is applicable to any direct-injection, spark-ignited internal combustion engine capable of operating with a stratified charge of a fuel-air mixture and operative to control fuel injection as described.

The exemplary engine comprises a plurality of variable volume combustion chambers 20, each defined by a closed-end cylinder formed in an engine block 25. A moveable piston 11 defines, with walls of the cylinder, the variable volume combustion chamber 20. A rotatable crankshaft 35 is connected by a connecting rod to each piston 11, which reciprocates in the cylinder during ongoing operation. A cylinder head 27 is sealably attached to the block 25 at an end thereof distal from the crankshaft 35, and forms the combustion chamber 20 with the cylinder walls and the piston 11. The cylinder head 27 provides a structure for intake port 17, exhaust port 19, intake valve(s) 21, exhaust valve(s) 23, in-cylinder fuel injector 12, and spark plug 14. The exemplary fuel injector 12 comprises a known conventional, solenoid-operated, inwardly-opening, pintle-type multi-hole fuel injector device which is fluidly connected to a pressurized fuel supply system to receive fuel, is operative to directly inject or spray pressurized fuel into the combustion chamber 20 periodically during ongoing operation of the engine. Actuation of the fuel injector 12, and other actuators described herein, is controlled by an electronic engine control module ('ECM'), which is an element of the control system 5. Spark plug 14 comprises a known spark-igniter device operative to ignite a fuel-air mixture, or combustion charge, formed in the combustion chamber 20. The spark plug has a tip portion inserted in the combustion chamber which includes an electrode and a cathode having a spark plug gap formed therebetween. The fuel injector and the spark plug tip are preferably placed in relative proximity to one another, such that injected fuel interacts with the spark plug tip during engine operation. Requisite ignition energy is delivered to the cathode of the spark plug 14 for discharge across the spark plug gap as an electrical arc, at appropriate times relative to combustion cycles, from an ignition module (not shown) controlled by the ECM. The intake port 17 channels air to the combustion chamber 20. Flow of air into the combustion chamber 20 is controlled by one or more intake valves 21, operatively controlled by a valve actuation device such as a camshaft (not shown). Combusted (burned) gases flow from the combustion chamber 20 via the exhaust port 19, with the flow of combusted gases through the exhaust port controlled by one or more exhaust valves 23 operatively controlled by a valve actuation device such as a second camshaft (not shown). Specific details of a control scheme to control opening and closing of the valves are not detailed. It is understood that various engine components, including valve control mechanisms and schemes for variable cam phasing and variable valve actuation, fall within the purview of the invention. Other generally known aspects of engine and combustion control are known and not detailed herein. In at least one embodiment of the invention, the engine can be configured to achieve in-cylinder swirl of the air-fuel charge. This can be accomplished by employing butterfly valves to control intake flow through one of two intake valve ports when the engine intake manifold and cylinder head is so equipped.

As previously described, the ECM is preferably an element of the overall control system 5 comprising a distributed control module architecture operative to provide coordinated powertrain system control. The ECM synthesizes pertinent information and inputs from sensing devices, including a crank sensor 31 and an exhaust gas sensor 40, and executes algorithms to control operation of various actuators, e.g. the fuel injector 12 and the ignition module, to achieve control targets, including such parameters as fuel economy, emissions, performance, driveability, and protection of hardware. The ECM is preferably a general-purpose digital computer generally comprising a microprocessor or central processing unit, storage mediums comprising read only memory (ROM), random access memory (RAM), electrically programmable read only memory (EPROM), high speed clock, analog-to-digital (A/D) and digital-to-analog (D/A) conversion circuitry, and input/output circuitry and devices (I/O) and appropriate signal conditioning and buffer circuitry. A set of control algorithms, comprising resident program instructions and calibrations, is stored as machine-executable code in ROM and executed to provide the respective functions. Algorithms are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

Timing of spark ignition is closely coupled to timing of injector openings and closings. The control scheme described herein comprises controlling fuel injection of first and second fuel injection pulses such that there is a combustible mixture present at the spark plug gap during the period when ignition energy is discharged across each spark plug gap, i.e., a fuel-air equivalence ratio that is approaching or greater than 1.0.

The exemplary fuel injector 12 is actuated, or pulsed, multiple times during each combustion event, as required and described herein, to achieve the desired effect. The results presented herein comprise results achieved for double-pulsing fuel injection pulses. Fuel injection is described in terms of timing of start of each injection, amount of fuel injected during each injection pulse, and injection dwell time, i.e., elapsed time from an end of a first injection pulse to start of a second injection pulse during a combustion cycle.

Figure 5:
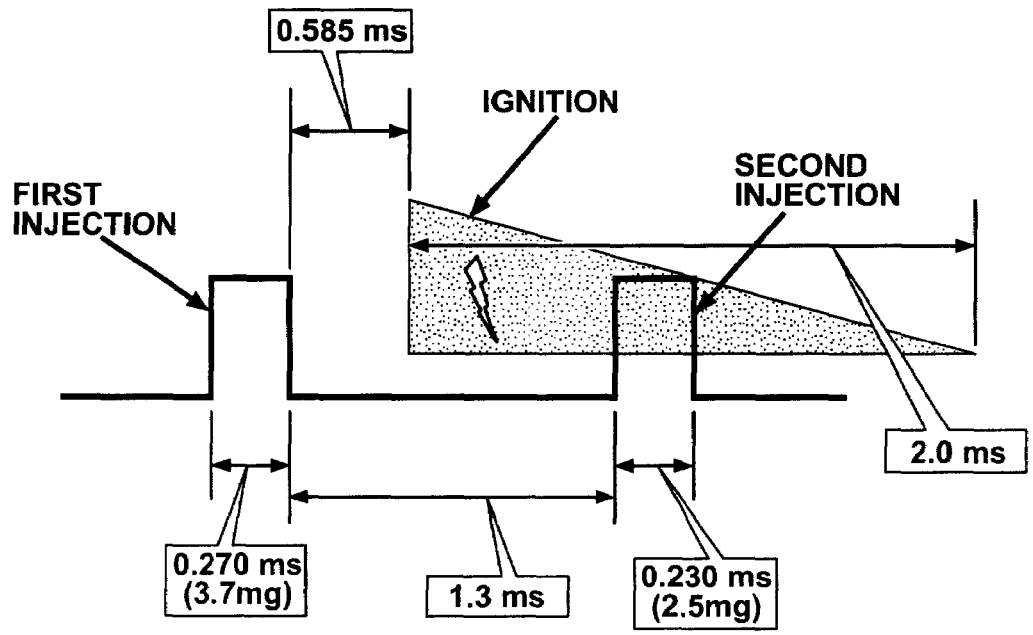

The exemplary ignition module comprises known inductive-type ignition system producing a triangular current waveform, with ignition duration represented by a triangle having an elapsed time duration, as shown in FIG. 5. Other ignition systems, including those having alternating-current waveforms of square or saw-tooth current outputs, are applicable, with spark ignition duration and energy of the spark discharge being key control criteria.

Timing of the spark ignition preferably comprises a pre-calibrated timing, relative to crankshaft angle rotation, piston position, and direction of piston travel, effective to achieve a mean-best-torque output from the engine. Spark ignition generally includes a spark-advance timing, comprising an engine position at which ignition is initiated, defined in terms of engine crank angle before top-dead-center (bTDC) of each compression stroke for the typical four-cycle engine. Spark ignition includes a dwell time, comprising an elapsed time during which the ignition energy is discharged across each spark plug gap.

The spark dwell time and corresponding spark arc are preferably of sufficient duration to ignite the combustion charge formed at the spark plug gap by the second fuel injection pulse, as described herein. The duration of the spark arc is preferably equal to or greater than the period of time between fuel injection pulses, i.e., from end-of-injection to end-of-injection. Conversely, the period between two fuel injection pulses is preferably less than the length of the spark arc. Duration of the spark arc is determined to avoid a time period between the two injection pulses when there may be no ready ignitable mixture present. In a situation wherein duration of the spark arc is less that the period between the two injection pulses, and the spark ignition occurs during this time period when no ignitable mixture is ready, misfires and partially burning combustion cycles can result. In this embodiment, a preferred spark dwell time is around 2.0 milliseconds in duration to achieve ignition of the combustible mixture.

Control of the Exemplary Engine

The invention described herein comprises a control scheme for operating the exemplary spark-ignited, direct fuel injection internal combustion engine, executed as algorithms and predetermined calibrations in the control module. The control scheme comprises injecting fuel into each combustion chamber multiple times during each engine cycle, including executing first and second fuel injection pulses. The first and second fuel injection pulses are controlled effective to achieve and maintain a spark-ignitable combustion charge proximal to the spark plug gap over a range of engine crank positions when spark ignition is likely energized. Spark ignition is preferably initiated at a predetermined period of time after end of the first injection, and the second fuel injection pulse preferably occurs after the initiation of spark ignition. The spark-ignitable combustion charge preferably comprises a fuel-air equivalence ratio near or greater than 1.0 proximal to the spark plug gap.

Referring now to FIGS. 2 through 8, more detailed operation of the exemplary engine is now described. Fuel injection, comprising fuel mass and timing of injection(s), and spark ignition, comprising spark timing and energy, are controlled based upon precalibrated schemes to achieve optimal operating conditions, including parameters related to operator torque demands, mean-best-torque, combustion variation, emissions, and smoke.

Figure 2:
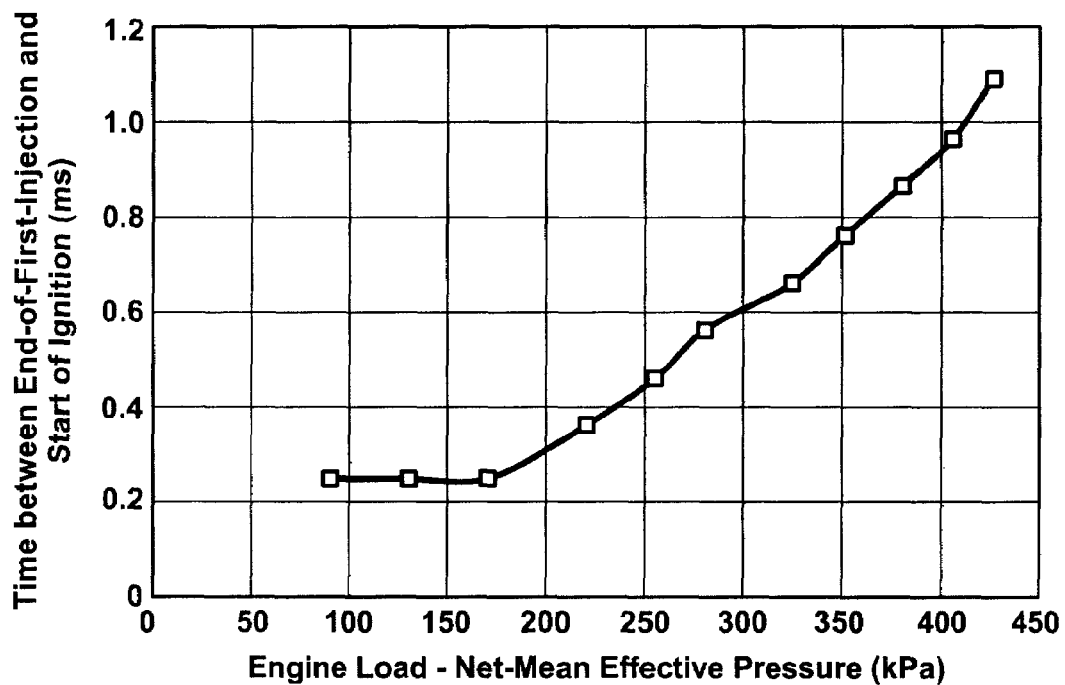
FIGS. 2-6 comprise graphical depictions, in accordance with the present invention.

Referring now to FIG. 2, a data graph is shown, depicting illustrative data for operating the exemplary SIDI engine. The data depicts a preferred elapsed time, in milliseconds, between an end of the first injection pulse and initiation of spark ignition, for engine loads ranging from a net mean effective pressure (NMEP) of less than 100 kPa to greater than 400 kPa, i.e., low to moderate loads. The elapsed time between the end of the first injection pulse and the start in spark ignition is an important parameter for effectively operating the exemplary SIDI engine. Specific parametric values are typically determined during pre-production calibration of an engine configuration and stored in ROM of the control module for use during ongoing operation of an engine.

Figure 3:
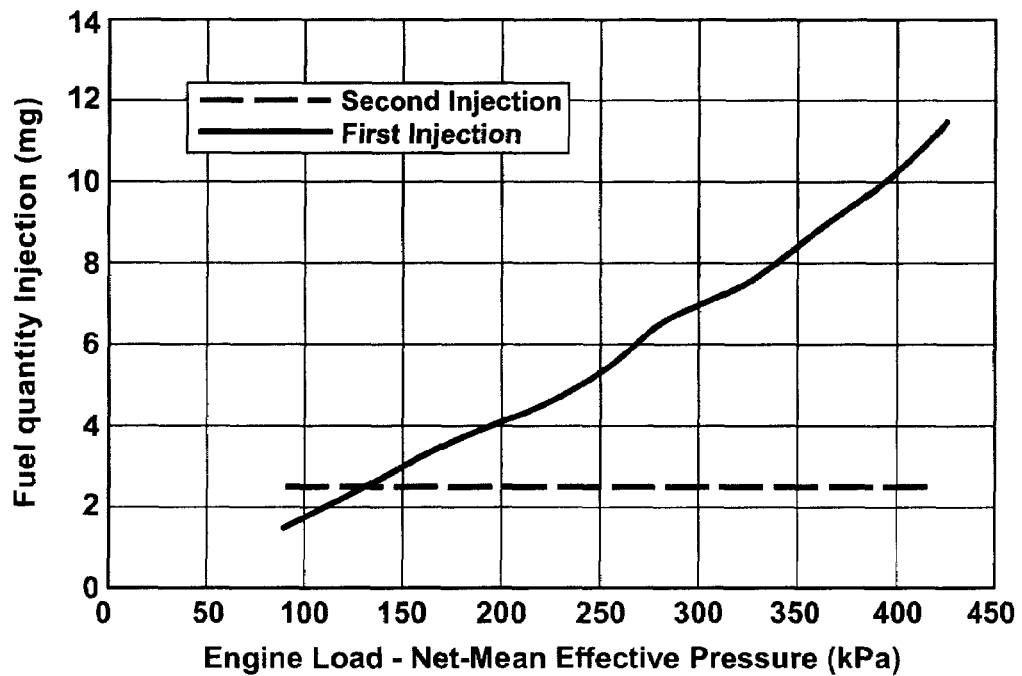

Referring now to FIG. 3, a data graph is shown, depicting illustrative data for fueling the exemplary engine, comprising a fueling quantity for injection, in milligrams (mg) shown for the first injection pulse and the second injection pulse, based upon engine load. In this example, the second injection pulse is fixed at a fuel mass of about 2.5 mg, across the range of engine loads shown. The fuel mass for the second injection pulse is preferably experimentally determined, and is based upon application-specific engine design and operating characteristics to achieve a combustible fuel-air mixture at the spark plug gap during spark ignition without negatively affecting emissions or smoke. Typical values for the second injection pulse range from around 1.0 mg of fuel to 2.5 mg of fuel. The combined amount of fuel delivered to the combustion chamber during the first and second injection pulses is sufficient to power the engine to meet the operator demand for torque.

The amount of fuel mass injected in the second pulse is critical. When a fuel mass less than a threshold value is injected into the combustion chamber, momentum of the resulting fuel spray is insufficient to effectively travel to the spark gap in a sufficiently deterministic way to form an ignitable mixture. It has been determined for the exemplary embodiment that the minimum mass of fuel injected after the spark event must be equal to or greater than 1.0 milligrams. The maximum mass of fuel injected after the spark event is dependent upon a probability of forming soot in overly rich fuel-air mixture regions, and must be determined based on engine load and speed operating conditions.

Figure 4:
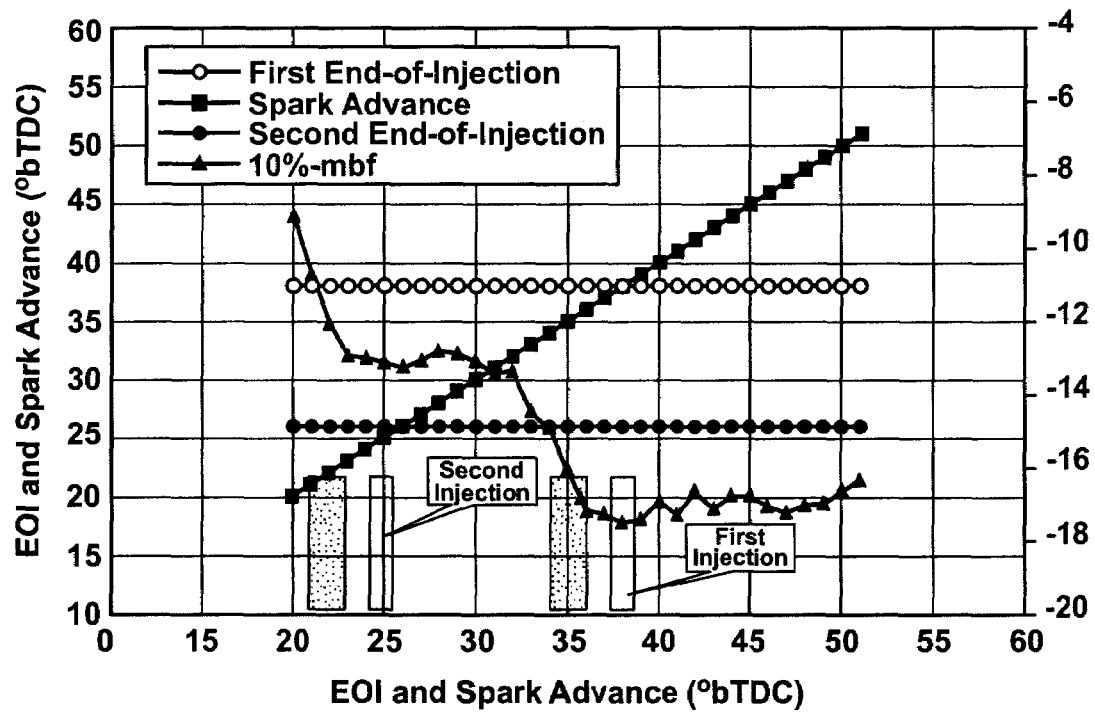

Referring now to FIG. 4, there is a graphical depiction of engine operation over ranges of double pulse injections and spark advances, plotted with a corresponding 10% mass-burned-fraction ('mbf') spark advance location for the operations. An optimal region of engine operation is defined as the spark advance, in crank angle before top-dead-center (bTDC) at which the 10% mass-burned-fraction ('mbf') location ceases to respond and becomes horizontal or flat. The flattening of the 10% mbf location indicates that any energy deposited by the spark arc before formation of the optimal region is wasted. The results demonstrate that there are two optimal regions of fuel injection for the double pulse injection. The two optimal regions of fuel injection are identified as 'First Injection' and 'Second Injection', which designate end-of-injection times before TDC. The adjacent regions depict presence of an ignitable mixture at or near the points whereat the 10% mbf curve flattens out as a result of executing the fuel injections at the 'First Injection' and 'Second Injection' periods. Thus, having two injections instead of one injection doubles the opportunity for having an ignitable mixture proximal to the spark plug during each combustion cycle, and timing of injection can be selectively controlled to achieve optimal engine operation. However, in a circumstance whereat the spark arc duration is shorter than the stated criteria and the spark is timed to occur in between the two optimal regions, then misfires and partially burning combustion cycles can result because an ignitable mixture may not present in between the two optimal regions. For robust ignition over a range of spark advances, the time duration of the spark arc is preferably sufficient to ignite the first optimal region of operation with the head of the spark arc before it loses the possibility of igniting the second optimal region of operation with the tail of the spark arc.

Referring now to FIG. 5, a timing chart is shown, depicting timing of a first injection pulse, spark ignition, and a second injection pulse for a low-load operating point that is illustrative of the invention. In operation, the control module determines engine load and an operator demand for torque, from which is determined a total mass of fuel to deliver to the engine during the first and second injection pulses, in this illustration being an engine load requiring 6.2 mg fuel. From this total mass of fuel, a first injection pulsewidth of 0.270 milliseconds delivers 3.7 mg of fuel during the first injection, and a second injection pulsewidth of 0.230 ms delivers 2.5 mg of fuel during the second injection, shown with reference to FIG. 3. An elapsed time of 0.585 ms from end of the first injection until the start of ignition is determined based upon the calibration graph shown with reference to FIG. 2. The first injection pulse and the delay time until start of ignition are determined based upon engine operating conditions of speed and load, and operator demand, as calibrated with reference to FIGS. 2 and 3. The start of the second injection pulse is determined with reference to FIG. 4, such that the second injection occurs at a spark advance effective to reach the preferred point for 10% mass-burned-fraction ('mbf') spark advance. The second injection pulse is effective to achieve a combustible fuel-air equivalence ratio proximal to the spark plug gap during the period in time when ignition energy is being discharged across the spark plug gap, resulting in ignition of the fuel-air charge.

Figure 6:
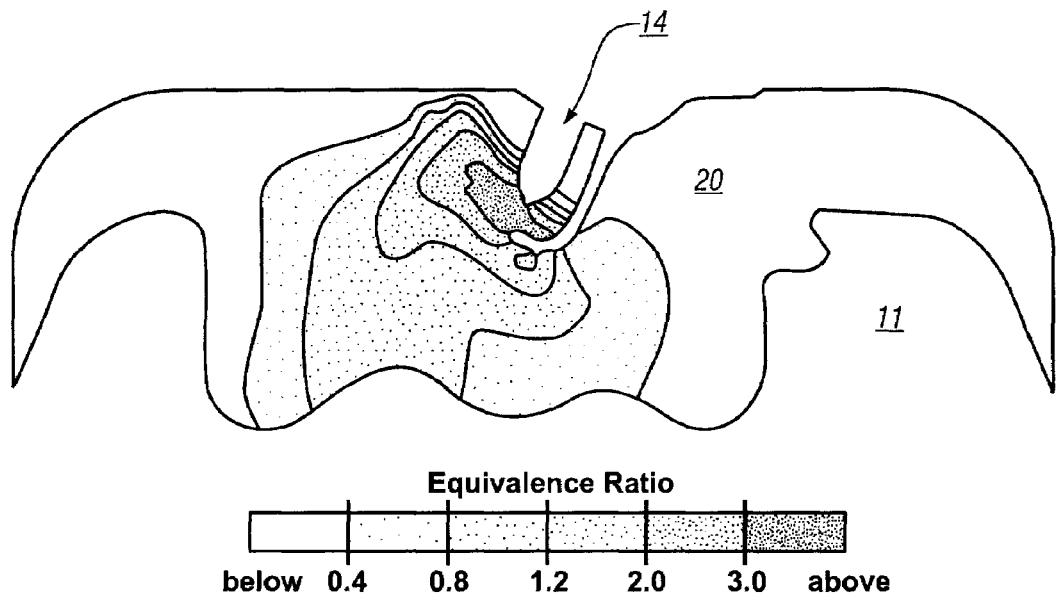

Referring now to FIG. 6, a cross-sectional drawing of the exemplary combustion chamber is shown, depicting a distribution of the fuel equivalence ratio measured around the gap of the spark plug 14 in the combustion chamber 20, at the time of the spark ignition for the exemplary engine operated in accordance with an embodiment of the invention. The figure depicts lines of constant fuel-air equivalence ratios, ranging from below 0.4 to above 3.0, in the combustion chamber. The results indicate the fuel-air equivalence ratio at the spark plug gap is above 3.0 at the time for spark ignition, i.e., there exists a locally rich fuel-air mixture that can be ignited reliably. Therefore, at least two effects result from double pulsing. First, injecting a smaller mass of fuel during a pulse results in lower penetration of the fuel spray into the combustion chamber than occurs with a single pulse fuel injection. This helps to keep an ignitable fuel-air mixture higher nearer the plug gap for a longer period of time. Secondly, it is seen that the second fuel pulse, occurring after the initiation of spark ignition results in an ignitable mixture around the spark gap for an extended period of time. As a result, it significantly increases the likelihood that the fuel-air mixture proximal to the spark gap is near or above stoichiometry.

Figure 7:
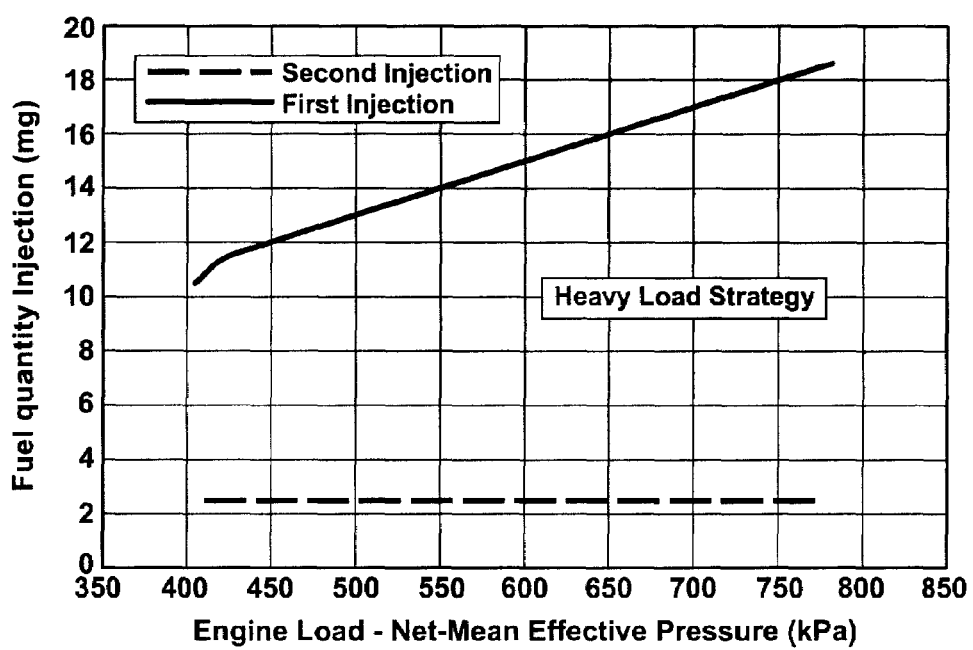
FIGS. 7 and 8 comprise calibration data, in accordance with the present invention; and, FIGS. 9-13 comprise data-graphs, in accordance with the present invention.
Figure 8:
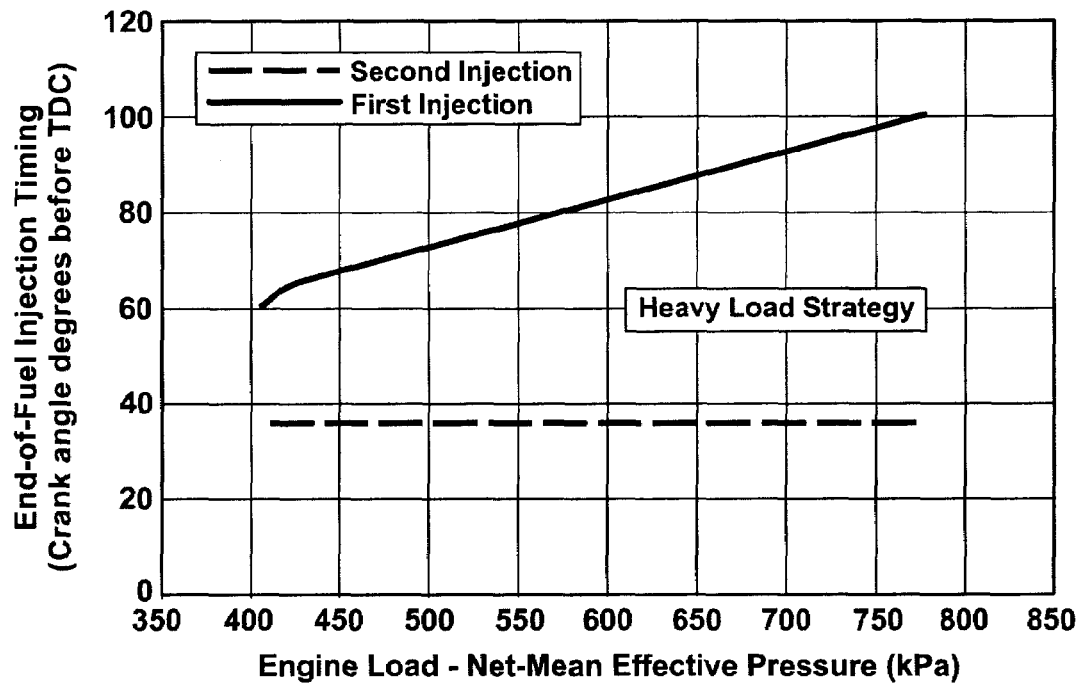

Referring now to FIGS. 7 and 8, graphical depictions of calibration data for operating the exemplary engine under high load conditions using the dual pulse injection control strategy are now described. The calibration data are meant to be illustrative. Referring to FIG. 7, fuel quantities injected during the first and second injection pulses are depicted over engine loads ranging from moderate to high loads. The second injection is held constant at about 2.5 mg across the load range, and the first injection increases with increasing load. Referring to FIG. 8, timings of ends-of-injection (in crank angle degrees bTDC) are depicted for engine loads ranging from moderate to high load. The end of the second injection is held constant across the load range at about 5.5 degrees bTDC, and the end of the first injection increases with increasing load. In the embodiment described, the quantity of fuel injected and the timing of the end of the injection event (bTDC) during the second injection event are held constant, shown herein as about 2.5 mg fuel, and end of injection timing of about 38 crank angle degrees bTDC. The quantity of fuel injected during the first injection varies according to load, and the timing of the end of the first injection both vary, both increasing with increasing load. In high load operation, overall timing of the spark ignition can be separately optimized to yield optimal engine operation, determined based upon maximizing combustion stability and engine torque and minimizing emissions.

Results of the Engine Control

Controlling the exemplary engine as described herein results in a demonstrable increase in an operating range for spark advance, resulting in improved combustion stability, measured in terms of coefficient of variation of indicated mean effective pressure (COV of IMEP), reductions in engine-out emissions and smoke formation, and reduction in fuel consumption. These effects are now described.

Figure 9:
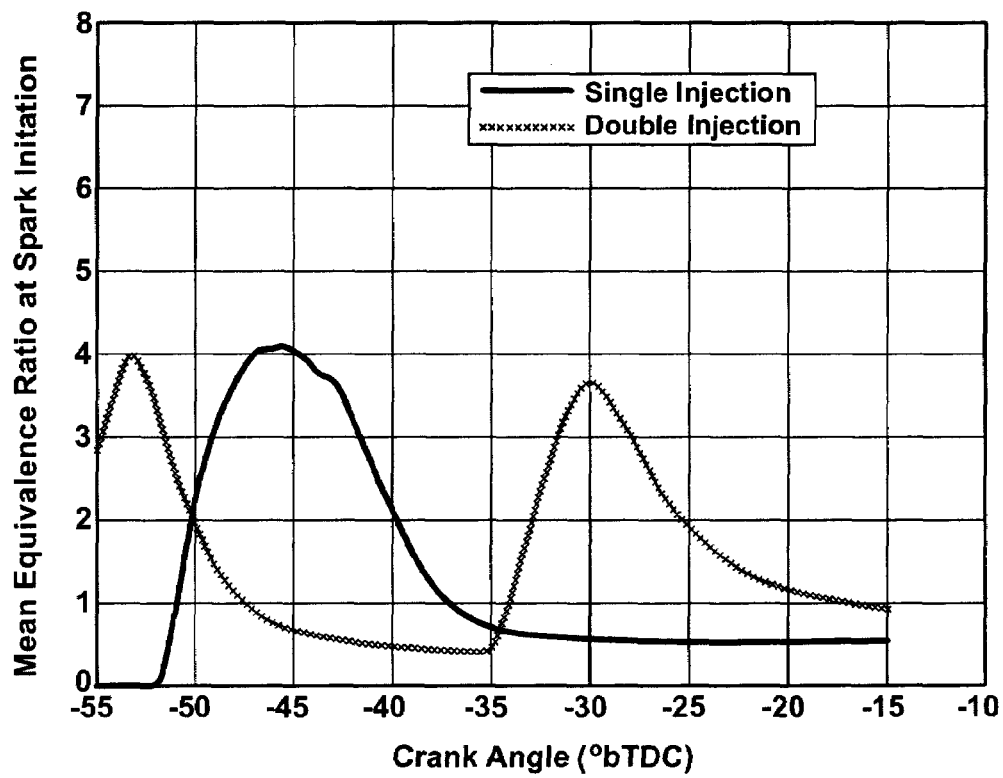

Referring now to FIG. 9, fuel-air equivalence ratios near the spark plug gap are plotted as a function of engine crank angle for single and double-pulse injections. For the single-pulse injection event, the fuel-air equivalence ratio at the spark-plug gap rapidly leans out as depicted by the curve shown as a solid line. The double pulse injection is effective to maintain the equivalence ratio at the spark-plug gap near or above a fuel-air equivalence ratio of 1.0, i.e., near or rich of stoichiometry, at two periods of operation during the compression stroke, and is more conducive to complete combustion at a period in time at which spark may be discharged across the spark plug gap during ongoing engine operation.

Figure 10:
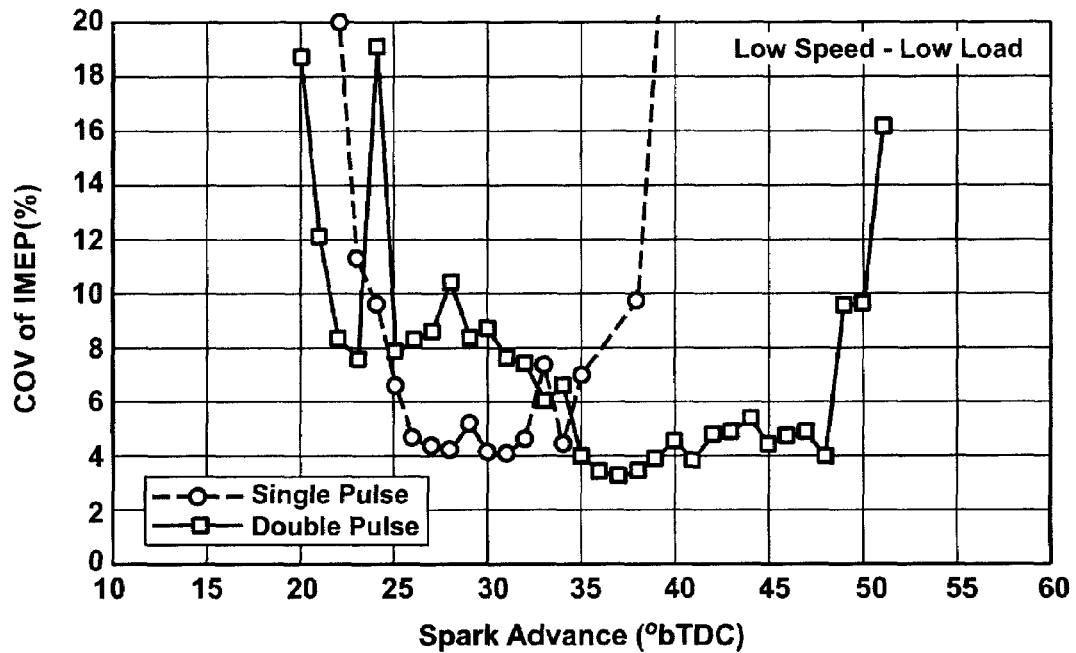

Referring now to FIG. 10, exemplary results showing combustion stability, measured in terms of COV of IMEP, are depicted over a range of ignition spark advance values for the single and double fuel injection pulse operations at low speed, low load operation. The exemplary results were obtained by operating the exemplary engine at 1000 RPM at a low engine load. For this low speed-low load operating point, combustion stability is demonstrated over a broader range of ignition spark advances for the double fuel injection pulse operation, as compared to the single fuel injection pulse operation. It is notable that using the double pulse operation permits a broader range of spark advance authority towards greater spark advance (increasing advance), whereas both the single and double pulse injection schemes demonstrates similar authority when the spark advance is retarded (decreasing advance).

The benefits of multiple fuel injection pulse operation at low engine loads comprise a reduction in COV of IMEP resulting from an increase in the stable region of spark timing, leading to improved engine performance including a reduction in hydrocarbon emissions. The stable region of spark timing is defined as the range of spark timing that results in a COV of IMEP that is less than or equal to a target COV of IMEP, typically less than 10%.

Figure 11:
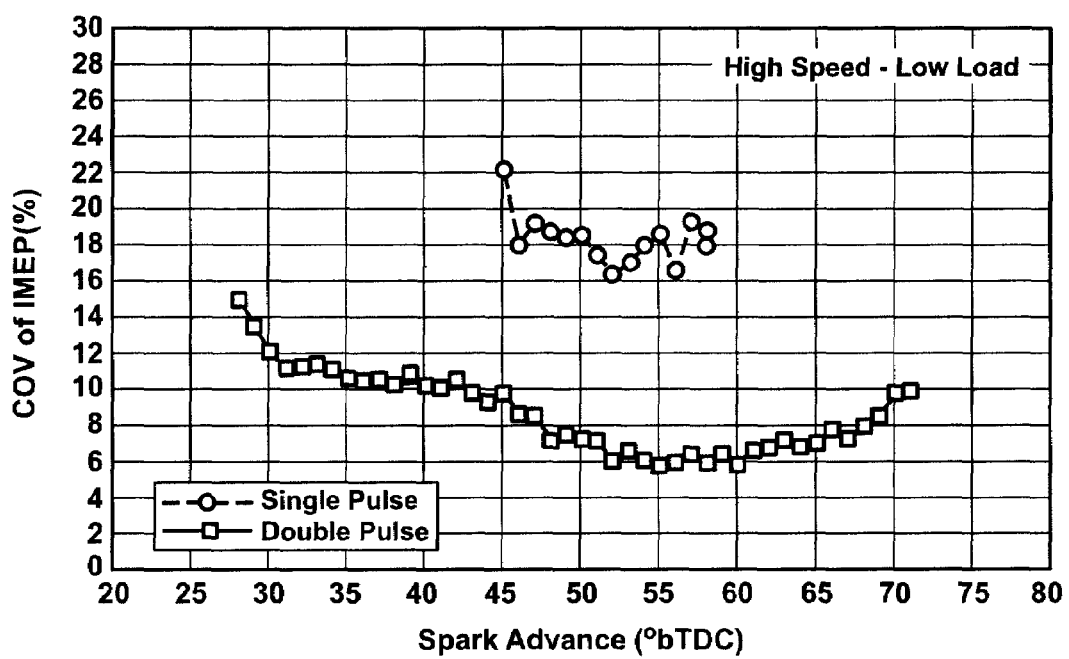

Referring now to FIG. 11, exemplary results depicting combustion stability, measured in terms of COV of IMEP, are plotted over a range of ignition spark advance values for the single and double fuel injection pulse operations at high speed, low load operation. The exemplary results were obtained by operating the exemplary engine at 3000 RPM at a low engine load. For this high speed-low load operating point, overall combustion stability is lower at every spark advance, and low combustion stability is demonstrated over a broader range of ignition spark advances for the double fuel injection pulse operation, as compared to the single fuel injection pulse operation. The results demonstrate that double pulse injection permits the engine control scheme to operate over a wider range of spark advance angles to achieve MBT without adversely affecting engine stability, thus improving robustness of the ignition process. This broader range of engine operation is the result of having a combustible fuel charge resident proximal to the spark plug electrode for an extended period of time during each engine cycle.

Figure 12:
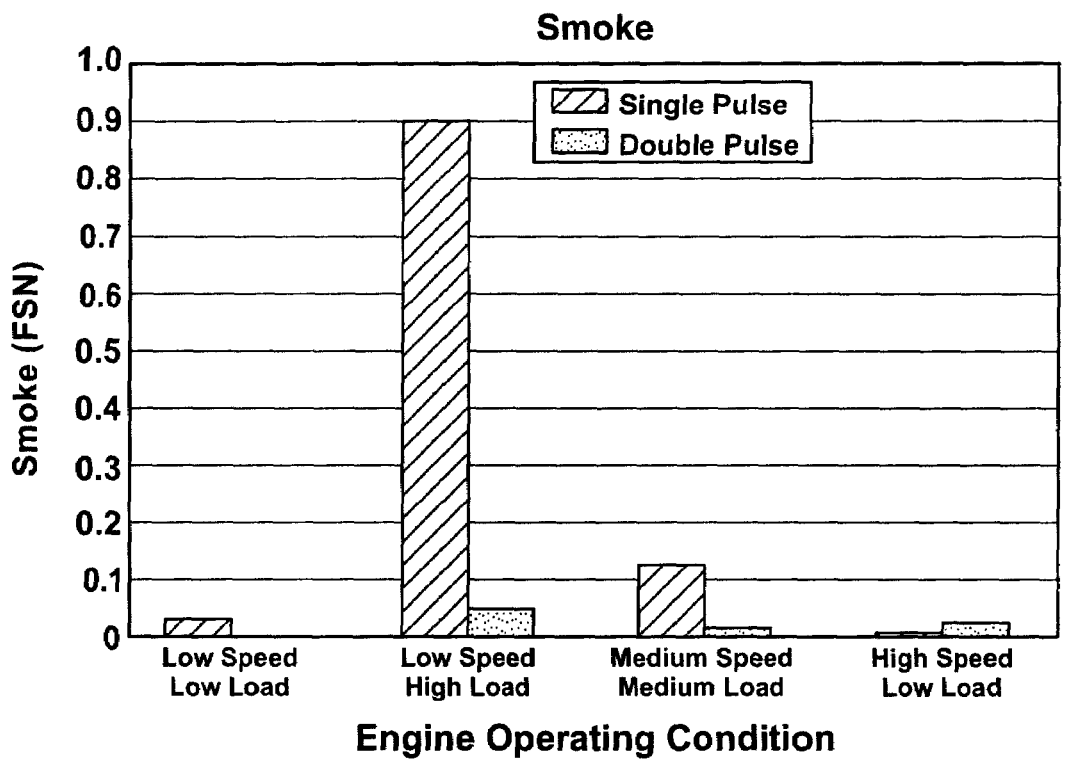

Referring now to FIG. 12, results are provided which depict tailpipe smoke (measured in units of FSN) when operating the exemplary engine at different operating points with single and double injection pulses. The operating points include low speed at low load, low speed at high load, moderate speed at moderate load, and high speed at low load. From the standpoint of tailpipe smoke, operating the exemplary engine using double injection pulses results in benefits at the moderate and high loads. There are three ways in which smoke is reduced by double fuel pulses at heavier loads. The first is through reduced quantity of wall wetting of the fuel spray onto the piston surface. By injecting a substantial portion of the fuel earlier when the piston is farther away than is possible with single pulsing, the mass of fuel vapor impinging on an ascending piston is reduced, demonstrable using analytical tools including computational flow dynamics (CFD). Liquid fuel on walls of a combustion chamber evaporates relatively slowly, resulting in subsequent rich burning. Thus less liquid on the walls of the combustion chamber and piston results in a corresponding reduction in smoke production. A second reason for reduced smoke is a result of lower penetration of the fuel spray, due to the reduced mass of injection in the first pulse. Therefore there is reduced wall and piston impingement. A third reason for reduced smoke is a result of reduction in rich regions in the combustion charge, due to better mixture preparation of the bulk mixture. Interruptions in injection caused by multiple injection events result in a greater amount of air in the combustion charge being entrained into the fuel-air mixture.

Figure 13:
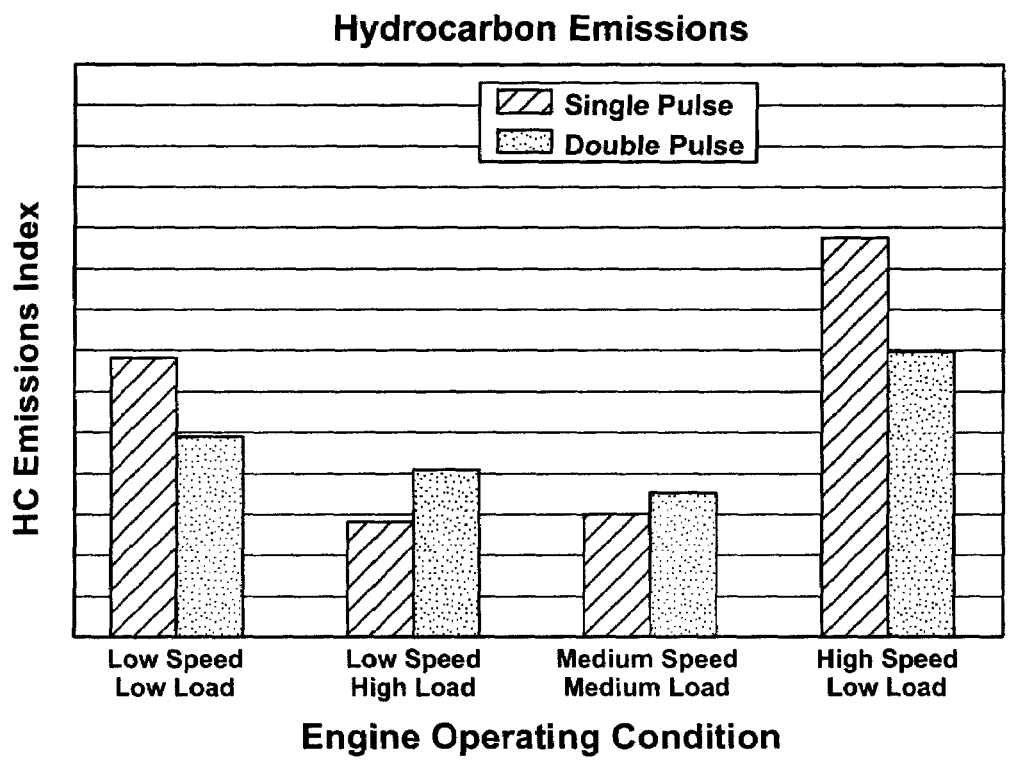

Referring now to FIG. 13, a graphical depiction of hydrocarbon emissions (EIHC) results, measured in g/Kg of fuel, with single pulse injection and double pulse injection for four engine operating points, comprising low speed-low load, low speed-high load, moderate speed-moderate load, and high speed-low load. A substantial decrease in EIHC emissions is achieved with the double pulse injection at low load operating conditions.

The preferred engine operation comprises employing multiple fuel injection pulses during ongoing operation, with timing and duration of each of the pulses and timing and duration of the ignition spark controlled so that spark ignition occurs when an ignitable fuel-air mixture is proximal to the spark plug during each combustion cycle.

The invention has been described with specific reference to the embodiments and modifications thereto. The specific details of the control schemes and associated results described herein are illustrative of the invention as described in the claims. Further modifications and alterations may occur to others upon reading and understanding the specification. It is intended to include all such modifications and alterations insofar as they come within the scope of the invention.

Having thus described the invention, it is claimed:

1. Method to operate a spark-ignited, direct fuel injection internal combustion engine, comprising:

injecting a first fuel pulse directly into an engine cylinder combustion chamber during a combustion cycle;

initiating spark ignition by energizing a spark igniter after a preferred elapsed time after an end of the first fuel pulse and prior to injecting a second fuel pulse; and, injecting the second fuel pulse directly into the engine cylinder combustion chamber during the combustion cycle to form a stratified charge of fuel-air mixture with an ignitable fuel-air mixture proximal to the spark igniter subsequent to said initiating spark ignition during a period in time whereat the spark igniter is energized.

2. The method of claim 1, further comprising: determining the preferred elapsed time between an end of the first fuel pulse and start of the spark ignition based upon engine load.

3. The method of claim 2, wherein the preferred elapsed time between the end of the first fuel pulse and start of the spark ignition comprises a minimum of about 0.25 milliseconds.

4. The method of claim 3, further comprising energizing the spark igniter for at least two milliseconds.

5. The method of claim 1, wherein a total mass of fuel injected during the first fuel pulse and the second fuel pulse is based upon the engine load.

6. The method of claim 1, wherein injecting the second fuel pulse directly into the engine cylinder combustion chamber during the combustion cycle to form a stratified charge of fuel-air mixture with an ignitable fuel-air mixture proximal to the spark igniter subsequent to said initiating spark ignition during a period in time whereat the spark igniter is energized further comprises:

executing the second fuel pulse to form the ignitable fuel-air mixture at a substantially minimum spark advance determined based upon initiation of combustion of the fuel-air mixture proximal to the spark igniter.

7. The method of claim 6, wherein the substantially minimum spark advance determined based upon the initiation of combustion comprises a minimum spark advance whereat 10% of the fuel mass is burned.

8. The method of claim 1, wherein injecting the second fuel pulse directly into the engine cylinder combustion chamber during the combustion cycle to form a stratified charge of fuel-air mixture with an ignitable fuel-air mixture proximal to the spark igniter subsequent to said initiating spark ignition comprises injecting the second fuel pulse to form a fuel-air mixture having an equivalence ratio substantially near or greater than 1.0 proximal to the spark igniter.

9. The method of claim 1, comprising initiating spark ignition by energizing the spark igniter at a spark advance to achieve an optimal engine output determined based upon engine torque and combustion variation.

10. Method to operate a spark-ignition, direct fuel injection engine to minimize exhaust emissions, comprising:

selectively controlling first and second fuel injection pulses injected directly into an engine cylinder combustion chamber to form a stratified charge of fuel-air mixture with an ignitable combustion charge proximal to a spark igniter over a range of engine crank positions during which the spark igniter is energized, and initiating spark ignition by energizing the spark igniter after a preferred elapsed time after an end of the first fuel injection pulse; wherein the first fuel injection pulse is injected prior to initiating spark ignition by energizing the spark igniter and the second fuel injection pulse is injected after initiating spark ignition of the spark igniter during a period of time when the spark igniter is energized.

11. The method of claim 10, comprising selectively controlling the end of the first fuel injection pulse based upon engine load and to reduce engine smoke when the engine is operating at medium to high engine load conditions.

12. The method of claim 11, further comprising selectively adjusting mass of the first fuel pulse based upon the engine load.

13. The method of claim 12, further comprising maintaining mass of the second fuel pulse substantially constant across a range of the engine loads.

14. The method of claim 10, comprising selectively controlling an end of the first fuel injection pulse based upon engine load and to reduce engine-out hydrocarbon emissions when the engine is operating at low load conditions.

15. Article of manufacture, comprising a storage medium having machine-executable code encoded therein to control operation of a spark-ignition, direct fuel injection internal combustion engine to minimize combustion variation, the code comprising:

code to inject a first fuel pulse directly into an engine cylinder combustion chamber during a combustion cycle;

code to initiate spark ignition by energizing a spark igniter after a preferred elapsed time after end of the first fuel pulse and prior to injection of a second fuel pulse; and, code to inject the second fuel pulse directly into the engine cylinder combustion chamber during the combustion cycle to form a stratified charge of fuel-air mixture with an ignitable fuel-air mixture proximal to the spark igniter subsequent to said initiation of spark ignition during a period in time whereat the spark igniter is energized.

16. The article of manufacture of claim 15, further comprising: code to determine the preferred elapsed time between an end of the first fuel pulse and start of the spark ignition based upon engine load.

17. The article of manufacture of claim 16, wherein the preferred elapsed time between the end of the first fuel pulse and start of the spark ignition comprises a minimum of about 0.25 milliseconds.

18. The article of manufacture of claim 17, further comprising energizing the spark igniter for at least two milliseconds.

19. The article of manufacture of claim 15, wherein a total mass of fuel injected during the first fuel pulse and the second fuel pulse is based upon the engine load.

* * * * *